United States Patent

Looney

[11] 4,167,490
[45] Sep. 11, 1979

[54] FLEXIBLE ULTRAVIOLET RADIATION TRANSMITTING FILTERS

[75] Inventor: Catharine E. Looney, Wilmington, Del.

[73] Assignee: E. I. DuPont de Nemours and Company, Wilmington, Del.

[21] Appl. No.: 642,713

[22] Filed: Dec. 22, 1975

[51] Int. Cl.² ............................ F21V 9/00; G02B 5/22
[52] U.S. Cl. ........................................ 252/300; 350/1.1; 260/465 D; 544/171; 428/219; 428/480
[58] Field of Search .............. 96/84 R, 84 UV; 350/1, 350/311; 428/219, 341, 411, 480; 252/300 R; 260/465 D; 544/171

[56] References Cited

U.S. PATENT DOCUMENTS

| | | | |
|---|---|---|---|
| 2,627,088 | 2/1953 | Alles et al. | 264/134 |
| 2,779,684 | 1/1957 | Alles | 264/134 |
| 2,803,640 | 8/1957 | Heckert | 260/465 |
| 3,382,183 | 5/1968 | Donoian et al. | 350/311 X |
| 3,390,994 | 7/1968 | Cescon | 96/48 |
| 3,390,996 | 7/1968 | MacLachlan | 96/48 |
| 3,813,255 | 5/1974 | Mannens et al. | 96/84 UV X |
| 3,874,876 | 4/1975 | Hibino et al. | 96/84 R X |
| 3,906,510 | 9/1975 | Hattori et al. | 350/311 X |
| 3,914,024 | 10/1975 | Tanabe et al. | 350/311 X |
| 3,918,976 | 11/1975 | Arai et al. | 96/84 UV X |
| 3,984,246 | 10/1976 | Ohlschlager | 96/84 R X |

Primary Examiner—George F. Lesmes
Assistant Examiner—R. Eugene Varndell, Jr.

[57] ABSTRACT

Flexible filters capable of transmitting radiation in the spectral range of 315 to 380 nm and absorbing radiation in the spectral range of 400 to 550 nm consist essentially of a thin flexible film, e.g., polyethylene terephthalate containing or having coated thereon a dye in a concentration of 15 to 60 mg/dm² and optionally, as a component of the coating, a thermoplastic organic binder, e.g., cellulose acetate butyrate, present in the coating with the dye, said dye being of the formula:

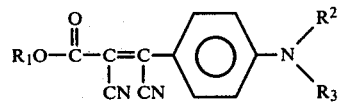

where $R_1$ is lower alkyl of 1 to 5 carbon atoms; $R_2$ and $R_3$, which may be the same or different, are selected from the group consisting of $R_1$, 2-cyanoethyl, 2-hydroxyethyl and

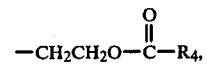

or form a saturated 5- or 6- membered ring; $R_4$ is taken from the class consisting of lower alkyl of 1 to 5 carbon atoms, aryl or alkaryl of 6 to 9 carbon atoms, and aralkyl. The filters are useful in exposing dual response photosensitive materials with ultraviolet radiation sources which contain appreciable quantities of visible radiation.

10 Claims, No Drawings

FLEXIBLE ULTRAVIOLET RADIATION TRANSMITTING FILTERS

BACKGROUND OF THE INVENION

1. Field of the Invention

This invention relates to flexible ultraviolet radiation transmitting filters, and more particularly to such flexible filters which transmit radiation in the ultraviolet region of the spectrum and absorb radiation in the visible region of the spectrum.

2. Description of the Prior Art

Dual response photosensitive compositions have been taught in U.S. Pat. Nos. 3,390,994; 3,390,996; 3,658,542; 3,658,543 and British Pat. No. 1,384,406. These compositions, which are photoimageable color-forming compositions, include such materials as hexaarylbiimidazoles and leuco dyes which form color on radiation with ultraviolet radiation, and can be deactivated against such color formation with radiation of a second wave length by incorporating therewith light-activatable oxidation-reduction systems, such as a visible light-activatable quinone in combination with a source of abstractable hydrogen. The manner in which the system operates is well documented. It is important to note, however, that hexaarylbiimidazoles which are preferred as photoactivatable oxidants absorb maximally in the region of 255 to 275 nm and usually show some lesser absorption in the region of 300 to 375 nm. The absorption bands tend to tail out to wavelengths as high as 420 nm. Thus radiation effective for imaging is in the range of 200 to 420 nm, preferably in the range of 255 to 375 nm. The deactivating component of the photoimageable color-forming compositions, which preferably is a polynuclear quinone, absorbs principally in the 400 to 550 nm region. Thus the radiation of the deactivating radiation source is in the range of 400 to 550 nm.

In practice, it would appear that many convenient sources of ultraviolet radiation can be used to activate the photoimageable color-forming compositions, whereas convenient sources of visible light can be used to achieve deactivation. Actually, however, few radiation sources have been found to be effective for color formation since the commonly-used radiation sources, e.g., those used in exposing diazo and photopolymerizable materials as well as xenon flash lamps, emit strongly in the visible region as well as the ultraviolet region. It has been found necessary to use optical filters to eliminate the visible components for effective color formation. The use of filters has been described in the aforementioned U.S. Patents.

As dual response photosensitive materials achieved greater commercial acceptance it was apparent that the filters described and available possessed disadvantages when used with standard radiation sources which emit radiation in a broad spectral range, e.g., 200 to 555 nm. One of the filters in common use is the Kokomo type 400, Kokomo Opalescent Glass Company. This glass type filter is useful with mercury vapor radiation sources. The Kokomo filter, however, has several disadvantages. It not only is breakable, but it is relatively expensive. In addition, an inventory of the glass should be maintained since it is not readily cut to any conceivable shape or size. The Kokomo filter has a tendency to break due to thermal absorption from the radiation source, thereby either requiring use of a cooling means or carefully positioning the filter some distance from the radiation source.

SUMMARY OF THE INVENTION

In accordance with this invention there are provided improved flexible filters which transmit radiation in the spectral range between 315 to 380 nm and absorb radiation in the spectral range between 400 to 550 nm consisting essentially of a thin flexible film substantially transparent to radiation in said spectral range having homogeneously added thereto a dye in a concentration of 15 to 60 mg/dm$^2$ of the formula:

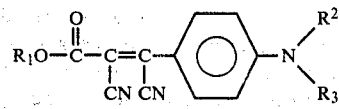

where $R_1$ is lower alkyl of 1 to 5 carbon atoms; $R_2$ and $R_3$, which may be the same or different, are selected from the group consisting of $R_1$, 2-cyanoethyl, 2-hydroxyethyl and

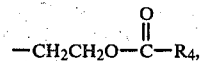

or form a saturated 5- or 6-membered ring; $R_4$ is taken from the class consisting of lower alkyl of 1 to 5 carbon atoms, aryl or alkaryl of 6 to 9 carbon atoms, and aralkyl; said dye optionally being present with a macromolecular thermoplastic organic binder.

DETAILED DESCRIPTION OF THE INVENTION

The novel filters of this invention consist essentially of a thin flexible film having homogeneously present in or bearing thereon an $\alpha,\beta$-dicyanovinyl dye of the above formula. Optionally when the dye is present on the surface of the flexible film a macromolecular thermoplastic organic binder is used.

Many types of flexible film bases or substrates are useful in the invention, provided that they readily transmit ultraviolet radiation between about 315 to 380 nm. The film should preferably be dimensionally stable and strong. Useful films include those prepared from high molecular weight materials such as polyethylene terephthalate, polyvinyl acetate, cellulose acetate, cellulose acetate butyrate, etc. The films range in thickness from about 0.03 to 0.30 mm in thickness.

Biaxially oriented polyethylene terephthalate is preferred for its outstanding properties, e.g., dimensional stability, strength, clarity and durability. A preferred thickness is in the range of 0.1 to 0.175 mm. If the film bears a dye layer or dye/binder layer, the film can have present on its surface a thin resin subbing layer to adhance adhesion. Such subbing layers are known and include those prepared as described in U.S. Pat. Nos. 2,627,088 and 2,779,684.

The dyes which are transparent to radiation in the range of 315 to 380 nm and absorb radiation strongly in the regions of the spectrum between 400 to 550 nm, maximally between 440 to 500 nm have the general formula:

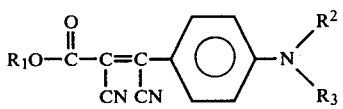

where $R_1$ is lower alkyl of 1 to 5 carbon atoms; $R_2$ and $R_3$, which may be the same or different, are $R_1$ as defined above, 2-cyanoethyl, 2-hydroxyethyl, or

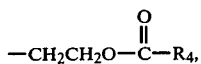

or may be joined to form a 5- or 6-membered ring, e.g., morpholine; $R_4$ is $R_1$ as defined above, aryl or alkaryl of 6 to 9 carbon atoms, or aralkyl, e.g., benzyl. The preferred dyes will be strong red to orange dyes with a fairly narrow absorption band, transparent to ultraviolet radiation, and exhibit good light fastness.

The preparation of the dyes of the above formula is either described in U.S. Pat. No. 2,803,640 or the dyes are prepared in an analogous manner. The basic steps in the synthesis include preparation of the substituted aminoaryl aldehyde, condensation of the aldehyde with a cyanoacetic ester, addition of HCN to form a leuco dye, and oxidation of the leuco dye to yield a α,β-dicyanovinyl dye.

The substituted aminoaryl aldehydes are available throught the Vilsmeier reaction, e.g., (Compound 1).

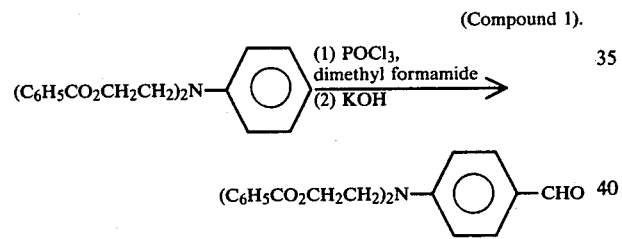

Compound 1 then undergoes a condensation reaction with cyanoacetic ester, e.g., (Compound 2).

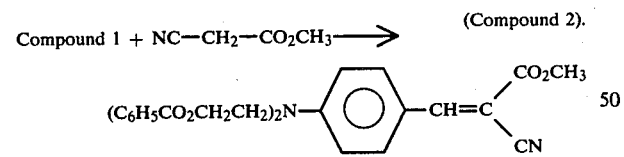

The elements of HCN are added across the ethylenic double bond of Compound 2, e.g., (Compound 3).

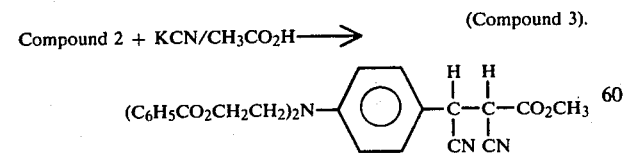

Oxidation of Compound 3 yields the α,β-dicyanovinyl dye, e.g., (Compound 4),

the preferred dye.

By using the above-described procedure, a wide variety of dyes can be synthesized varying in components $R_1$, $R_2$, $R_3$ and $R_4$ as defined above. It is noted that since the embodiments of the dye vary in substituents $R_1$ to $R_4$, which are at positions insulated from the chromophore of the dye, only a slight effect is achieved on the visible absorption of the α,β-dicyanovinyl dye of the invention.

The dyes have a high tinctorial strength in the visible region of the spectrum. Only small quantities of the dye are required to absorb visible radiation components from the radiation sources. Concentration of dye in the range of 15 to 60 mg/dm² will provide efficient filters, 30±3 mg/dm² of Compound 4 above being preferred. The dye represented by Compound 4 provides an excellent general purpose filter, including rigid filter, with radiation equipment commonly found in the trade.

The dyes of this invention have outstanding fastness to light. This is important since light fastness directly relates to the useful lifetime of the filter. Preferred dye, Compound 4 above, showed substantially no fading after exposure for at least 80 standard Fadeometer hours.

Generally when the dye is present on the film base a macromolecular organic polymeric binder is present therewith. The binder must be transparent to radiation in the region of the spectrum ranging from 315 to 380 nm. Representative binders include ethyl cellulose, polyvinyl alcohol, cellulose acetate, cellulose butyrate, cellulose acetate butyrate, etc. Cellulose acetate butyrate with a butyryl content of approximately 50%, no free hydroxyl groups/four anhydroglucose units, and a falling ball viscosity reading of 1 second is particularly preferred.

Preferably, the dye and binder are dissolved in a volatile organic solvent, e.g., methylene chloride, isopropyl alcohol, etc., to form a coating solution. The coating solution is then coated onto the substrate via conventional coating techniques, e.g. doctor knife, roll coater, etc. The coated film is then heated gently in a drying oven to evaporate the volatile organic solvent, as known in the trade, and the resulting coated filter is ready for cutting, slitting and packaging.

A preferred filter consists essentially of (a) a resin-subbed biaxially oriented polyethylene terephthalate film, 0.1 to 0.175 mm thick, coated with a homogeneous mixture, 200±20 mg/dm², of (b) a dye of the formula:

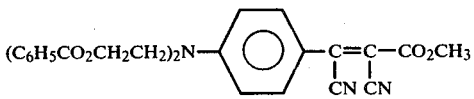

in an amount of 30±3 mg/dm², and (c) a cellulose acetate butyrate binder.

The preferred flexible film filter as well as other film filters can be made by various procedures. For example, an ultraviolet radiation transmitting film can be dyed or printed by conventional techniques with the dye with the proviso that the resulting filter has dye homogeneously distributed over the film. Preferably, a homogeneous coating solution of the dye, mixed with an ultraviolet-transparent organic polymeric binder, is uniformly coated by conventional means onto an ultraviolet transparent film. Preferably the binder is used to improve anchorage of the dye to the film, to provide a harder surface to retard abrasion, and to raise the coating solution viscosity to a level desirable for conventional coating techniques.

If the dye/binder coating is soft or tacky, a laminate can be formed by placing a thin flexible ultraviolet radiation transparent film on the dye-containing layer. The filter is then a laminate which has the dye coating protected from abrasion. The laminate structure is merely optional since the dye/binder layer is preferably hard and strongly resistant to abrasion.

The filters of the invention are advantageous because they are inexpensive, non-breakable flexible film filters prepared from commercially available film substrates. The filters are easily cut into any shape or size and are readily stored. They are substantially devoid of deleterious thermal absorption effects such as distortion or breakage. The presence of the $\alpha,\beta$-dicyanovinyl dye as defined enables the filters to transmit ultraviolet radiation in the range of 315 to 380 nm but substantially absorb visible light in the range of 400 to 550 nm.

The filters are particularly useful for exposing known dual response photosensitive materials when the radiation sources include mercury, xenon or carbon arcs. Improved resolution has also been noted when the filters have been used to expose some photopolymer materials, e.g., as disclosed in U.S. Pat. No. 3,649,268.

EXAMPLES OF THE INVENTION

The following examples illustrate the invention.

EXAMPLE 1

N,N-bis(2-benzoyloxyethyl)-p-$\alpha,\beta$-dicyano-$\beta$-methoxycarbonylvinyl) phenylamine is prepared according to the following steps:

Preparation of Aldehyde

N,N-bis(2-benzoyloxyethyl) aniline (88 g) was dissolved in dimethylformamide (76 g) by heating the mixture, with agitation, to 55° C. for one hour. When completely dissolved, the reaction mixture was cooled to 15° C., and slow addition of phosphorous oxychloride (45.9 g) was begun, maintaining the temperature below 20° C.; this addition required approximately 4 hours. After all the phosphorous oxychloride was added, the mixture was stirred (90 minutes) at 20° C., warmed to 70° C. over a 2 hour period, and maintained at 70° C. for an additional 2 hours. The reaction mixture, containing the formed salt, was then cooled to 20° C.

The salt formed above was hydrolyzed to the aldehyde by the slow addition of KOH (59 g) in water (84 g), added at such a rate that the temperature did not exceed 25° C. After addition of the KOH the pH was adjusted to 8 (add either KOH or hydrochloric acid as required). The precipitate was filtered and washed with water (650 ml.). The crude product was purified by recrystallization from denatured alcohol (318 g) to yield 4-(N,N-bis(2-benzoyloxyethyl) amino-benzaldehyde (64 g), m.p. 79°–81° C.

Preparation of Methine

The above aldehyde (38.4 g) and ethyl cyanoacetate (10.7 g) were dissolved in methanol (191 g), to which piperidine (0.7 g) was added slowly. The reaction mixture was then heated slowly to reflux temperature (65° C.), and maintained at that temperature for 2 hours. The reaction mixture was cooled to 20° C., and the product was isolated by filtration. The crude product was purified by stirring with denatured alcohol (215 g) at 20° C. for 30 minutes, then was filtered and dried, to yield: N,N-bis(2-benzoxyloxyethyl)-p-($\beta$-cyano-$\beta$-methoxycarbonylvinyl) phenylamine (45.4 g), m.p. 115°–9° C.

Preparation of Leuco Dye

The methine intermediate prepared above (24 g) was dissolved in dimethyl formamide (85 g), and the mixture warmed to 70° C. A mixture of KCN (3.5 g) in water (18 ml) was added over a period of 45 minutes insuring that the temperature did not exceed 75° C. Upon completion of the addition, the mixture was stirred at 70° C. for 45 minutes; acetic acid (191 g) was added to the mixture over a period of 30 minutes. The HCN evolved was purged by nitrogen through a scrubbing train for safe disposal. The mixture was cooled to 20° C. and added to water (900 ml) over a 20-minute period, accompanied by vigorous stirring. The resultant aqueous mixture was then extracted with methylene chloride (400 g) and the aqueous layer discarded. The organic phase was washed twice with water (900 ml), followed by a wash with sodium bicarbonate (32 g) in water (470 g). The organic phase was then removed and reduced to one half its volume (by evaporative distillation). The cooled methylene chloride layer (20° C.) was then added to isopropanol (1700 g), which had been cooled to 8° C., and the mixture was stirred for one hour at a temperature below 10° C. The crude resultant solid was purified by slurring with hot methanol (120 ml), filtered and dried. The product, N,N-bis(2-benzoyloxyethyl)-p-($\alpha,\beta$-dicyano-$\beta$-methoxycarbonylethyl) phenylamine (14.6 g), melted over the range 90° to 95° C., and had an extinction coefficient of about 23,000 at 268 nm, measured in $CHCl_3$.

Preparation of Dye

The above leuco dye (127 g, 0.24 mole) was dissolved in glacial acetic acid (500 ml), by warming the mixture to 55° to 60° C. Lead tetraacetate (0.264 mole, 117 g) was added in small portions to maintain the reaction mixture at 60° C. Following completion of the addition, the mixture was stirred an additional 2 hours at 60° C.; the mixture was cooled in an ice bath wherein the crude dye precipitated and was isolated by filtration. The crude dye was purified by recrystallization from denatured alcohol (one liter), and dried in a vacuum oven. The dye produced was N,N-bis(2-benzoyloxyethyl)-p-$\alpha,\beta$-dicyano-$\beta$-methoxycarbonylvinyl) phenylamine (74 g), having a molar extinction coefficient of about 32,300 at 480 nm in $CHCl_3$.

Preparation of Filter

A coating solution was prepared containing the above dye (17.8 g) and cellulose acetate butyrate (100.7 g, EAB-500-1) dissolved in methylene chloride (607 g). This coating solution was applied by means of an extrusion die onto the sub layer of a 0.1 mm-thick polyethylene terephthalate clear film support, prepared as described in Example IV of U.S. Pat. No. 2,779,684, containing an insoluble resin sub on one side only. The coating was dried in hot air (65.6° C.), the dried coating weight being 200±20 mg/dm².

EXAMPLES 2 to 4

A dual response photosensitive proof paper described in Example 14 of U.S. Pat. No. 3,658,543 was exposed to four radiation sources indicated in Table I. One exposure with each radiation source utilized no filter (control), two exposures with each radiation source utilized known filters, and the fourth exposure with each radiation source utilized the filter prepared as described in Example 1.

From the Table I which follows it is noted that when the radiation source is a Blacklite Blue flourescent lamp (BLB), an image of excellent intensity is obtained without the need of a filter. Such a radiation source transmits insufficient quantities, if any of radiation between 400 and 550 nm, which deactivates the imaging reaction.

In Example 2, the radiation source, as indicated, is one that is commonly used for exposing photopolymerizable material. In the absence of a filter, the photopolymerizable radiation source strongly deactivates the imaging reaction, i.e., the fixing reaction which requires radiation between 400 and 550 nm has been highly activated. When filters such as Kokomo and the filter of Example 1, are used optical densities equal to unfiltered BLB exposure are obtained. The Roscolene 818A filter, a product of Rosco Laboratories, Inc., Port Chester, New York, provides inferior results when compared with the two aforementioned filters.

As shown in Example 3, no image is obtained with a diazo type radiation source unless a filter is used. The diazo radiation source emits appreciable radiation in the range of 400 to 550 nm, enough to overwhelm completely the imaging reaction. With this radiation source the filter of Example 1 is less effective than the Kokomo filter but superior to the Roscolene 818A filter.

Example 4 illustrates that when the radiation source is a pulsed xenon radiation source the only effective filter is the filter of Example 1.

TABLE I

| | | | OPTICAL DENSITY | | | |
|---|---|---|---|---|---|---|
| Example No. | Radiation Source | Exposure Time (min.) | No Filter | Kokomo 400 Filter | Roscolene 818A Filter | Example I Filter |
| Control | BLB[a] | 0.75 | 1.05 | — | — | — |
| 2 | Photopolymer[b] Type Lamp | 1.5 | 0.24 | 1.08 | 0.80 | 1.05 |
| 3 | Diazo Type[c] Lamp | 2 | <0.1 | 0.72 | 0.15 | 0.56 |
| 4 | Pulsed Xenon[d] | 3 | <0.1 | <0.1 | 0.28 | 0.48 |

[a]Bank of Sylvania Blacklite Blue fluorescent lamps to provide 80 to 100 millijoules per square centimeter of radiant energy at the exposure plane.
[b]Addalux ® mercury photopolymer type lamp Model No. 1406-02 (2 kw input) positioned 81.3 cm from the exposure plane.
[c]Addalux ® diazotype lamp Model No. 1406-01 (2 kw input) positioned 81.3 cm from the exposure plane.
[d]Standard nuArc ® flip top vacuum frame unit equipped with a pulsed xenon arc (8 kw input) positioned 1.52 meters from the exposure plane.

EXAMPLES 5 to 11

These Examples illustrate the effect of coating weight variations of the dye of Example 1 using several radiation sources upon exposing a proof paper bearing a dual response photosensitive composition substantially as described in Example 14 of U.S. Pat. No. 3,658,543. The dye concentration is fifteen weight percent of the total coating weight. As shown in Table II, specified image densities are obtained using the radiation source at the coating weight specified. The data show that the dye concentration has no substantial effect on the image densities obtainable with conventional carbon or xenon arcs. The diazo type source, however, is very sensitive to filtration efficiency and at the lowest concentrations, Examples 7 to 9, there is an appreciable drop in optical density. With the photopolymer-type radiation source substantially no image density variation is observed until the ultraviolet transmission is reduced at the highest dye concentration employed (Example 11).

TABLE II

| | | OPTICAL DENSITY FOR EXPOSURE SOURCES | | | | | | |
|---|---|---|---|---|---|---|---|---|
| Example | Total Coating Wt. (mg/dm²) | Diazo[c] (2 min) | Diazo[c] (1 min) | Photopolymer[b] (1 min) | Photopolymer[b] (0.5 min) | Carbon Arc[e] (3 min) | Xenon[d] Arc (3 min) | Xenon[d] Arc (1.5 min) |
| 5 | 204.6 | .77 | .57 | .72 | .56 | .52 | .45 | .34 |
| 6 | 243.9 | .76 | .54 | .70 | .54 | .56 | .44 | .32 |
| 7 | 148.4 | .69 | .52 | .71 | .56 | .60 | .46 | .34 |
| 8 | 117.5 | .57 | .44 | .71 | .54 | .58 | .45 | .35 |
| 9 | 92.1 | .45 | .35 | .71 | .55 | .57 | .45 | .35 |
| 10 | 179.8 | .75 | .54 | .70 | .53 | .62 | .47 | .35 |
| 11 | 312.8 | .77 | .54 | .63 | .47 | .58 | .44 | .33 |

[b]Addalux ® mercury photopolymer type lamp Model No. 1406-02 (2 kw input) positioned 81.3 cm from the exposure plane.
[c]Addalux ® diazotype lamp Model No. 1406-01 (2 kw input) positioned 813 cm from the exposure plane.
[d]Standard nuArc ® flip top vacuum frame unit equipped with a pulsed xenon arc (8 kw input) positioned 1.52 meters from the exposure plane.
[e]Exposures were made in a nuArc ® Rapid Printer, Type J, drawing 13 amps at 115 volts positioned 45.7 cm from the exposure plane.

EXAMPLE 12

A filter was prepared by the following procedure: The dye of Example 1 (55 mg), was formed into a paste with a fluorocarbon dispersant, $F[CF(CF_3)CF_2O]_9CF(CF_3)CO_2H$ (50 mg), and the paste was added to a fluorocarbon $F[CF(CF_3)CF_2O]_3CHFCF_3$ (20 ml., b.p. 152° C.) solvent. A rectangular piece of polyethylene terephthalate film (93.5 mm × 38.8 mm, 0.1 mm-thick, weighing 0.53 g) was then added, whereupon the stirred mixture was heated to reflux (152° C.) for five minutes. The film was then removed from the dyebath, cooled, and rinsed with trichlorotrifluoroethane. After drying, the resulting film was found to be strongly dyed, substantially to a depth comparable to the coated film of Example 1. The dyed film's dimensions (91.5 mm×37.0 mm) indicated a slight (3%) shrinkage. Finally, although the homogeneously dyed film filter resultant was slightly stiffer than the filter of Example 1, the transmittance and absorbance properties were substantially equivalent.

I claim:

1. A flexible filter capable of transmitting radiation in the spectral range between 315 and 380 nm and absorbing radiation strongly in the spectral range between 400 to 550 nm maximally absorbing in the spectral range between 440 to 500 nm, consisting essentially of a thin flexible film substantially transparent to radiation in the spectral range between 315 and 380 nm having homogeneously added thereto a dye in a concentration of 15 to 60 mg/dm² of the formula:

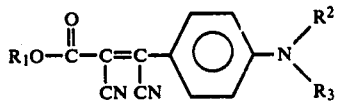

where $R_1$ is lower alkyl of 1 to 5 carbon atoms; $R_2$ and $R_3$, which may be the same or different, are selected from the group consisting of $R_1$, 2-cyanoethyl, 2-hydroxyethyl and

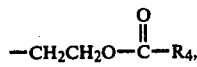

or from a saturated 5- or 6-membered ring; $R_4$ is taken from the class consisting of lower alkyl of 1 to 5 carbon atoms, aryl of 6 carbon atoms or alkaryl of 7 to 9 carbon atoms, and arakyl.

2. A filter according to claim 1 wherein the dye is homogeneously present in the film.

3. A filter according to claim 1 wherein the film bears a layer of the dye.

4. A filter according to claim 3 wherein a macromolecular thermoplastic organic binder is present in the dye layer.

5. A filter according to claim 4 wherein the dye and binder are present in the layer in the weight range of 180 to 220 mg/dm².

6. A filter according to claim 5 wherein the binder is cellulose acetate butyrate.

7. A filter according to claim 1 wherein the dye is of the formula

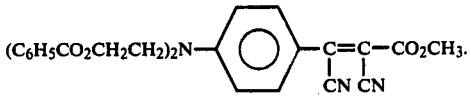

8. A filter according to claim 1 wherein the flexible film is polyethylene terephthalate.

9. A filter according to claim 3 wherein the dye layer bears a thin flexible ultraviolet radiation transparent film.

10. A flexible filter capable of transmitting radiation in the spectral range between 315 to 380 nm and absorbing radiation in the spectral range between 400 to 550 nm consisting essentially of
(a) a resin-subbed biaxially oriented polyethylene terephthalate film, 0.1 to 0.175 mm thick, coated with a homogeneous mixture, 200±20 mg/dm² of
(b) a dye of the formula:

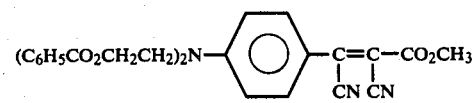

in an amount of 30±3 mg/dm², and
(c) cellulose acetate butyrate.

* * * * *